United States Patent [19]

Malatesta

[11] Patent Number: 4,890,953
[45] Date of Patent: Jan. 2, 1990

[54] WOOD BEAM JOINT AND METHOD OF FORMING

[76] Inventor: Natale D. Malatesta, Sexton Hill Rd., East Hampton, Conn. 06424

[21] Appl. No.: 76,917

[22] Filed: Jul. 23, 1987

[51] Int. Cl.[4] .............................................. F16D 1/00
[52] U.S. Cl. ................................... 403/178; 403/219; 403/339; 403/393; 144/354
[58] Field of Search ............... 403/219, 217, 170, 174, 403/231, 340, 339, 381, 382, 393, 364, 331, 178, 263, 345, 401, 403; 144/353, 354, 355

[56] References Cited

U.S. PATENT DOCUMENTS

| | | | |
|---|---|---|---|
| 1,094,020 | 4/1914 | Robinson | 403/339 X |
| 1,098,405 | 6/1914 | Reinecke | 403/382 X |
| 1,110,621 | 9/1914 | Gabel | 403/231 |
| 1,130,610 | 3/1915 | Kane | 403/339 |
| 1,317,932 | 10/1919 | Metcalfe, Sr. | 403/393 X |
| 2,155,729 | 4/1939 | Mainieri | 403/382 |
| 2,267,330 | 12/1941 | Goss | 144/354 X |
| 2,297,353 | 9/1942 | Goss et al. | 403/345 |
| 3,355,195 | 11/1967 | Takayanagi et al. | 403/364 |
| 3,507,524 | 4/1970 | Steidle-Sailer | 403/219 |
| 3,623,261 | 11/1971 | Freese | 403/393 X |
| 4,358,214 | 11/1982 | Shull | 403/178 X |
| 4,403,886 | 9/1983 | Haeusler | 403/217 |
| 4,637,147 | 1/1987 | Wolsey | 403/382 X |
| 4,684,282 | 8/1987 | Lever | 403/219 |

OTHER PUBLICATIONS

Frid, "Mortise and Tenon", 1976, pp. 16-21, Fine Woodworking.

Primary Examiner—Randolph A. Reese
Assistant Examiner—Peter M. Cuomo
Attorney, Agent, or Firm—Jack N. McCarthy

[57] ABSTRACT

A beam joint for connecting the ends of two wooden beams, the beam ends having overlapping matching tongues for connecting them together and providing angular mating surfaces for strengthening the joint, the joint being capable of being supported by a post; a mortise can be formed in the joint for receiving a tenon on the post.

14 Claims, 6 Drawing Sheets

WOOD BEAM JOINT AND METHOD OF FORMING

TECHNICAL FIELD

This invention relates to wooden post and beam construction and particularly to beam joints and method of forming along with post support at a joint.

1. Background Art

Many wood joints have been used to connect two short wood beams to make a long beam; however, subject construction could not be found. Known prior art joints consist of a plain angled scarf joint where the angled surface of the end of one beam rests on the matching angled surface of the end of the mating other beam. Some joints have been made by merely having plain overlapping end projections.

2. Disclosure of Invention

An object of the present invention is to provide an all wooden joint between beam ends for improved strength of joint, speed of assembly, and neatness of appearance in an exposed joint.

A further object of the present invention is to provide a wooden beam joint having mating ends with triangular or quadrilateral overlapping side tongues, each tongue having an angular end facing an angular surface on a matching triangular or quadrilateral recess on the mating wooden beam.

Another object of the present invention is to provide a wooden beam joint with wooden shear pegs.

A further object of the present invention is to provide a method of forming mating ends of wooden beams to have triangular or quadrilateral side tongues with meeting ends to form a rigid joint construction.

Another object of the present invention is to provide a method of forming mating ends of wooden beams to have an extended joint having meeting flat center portions for resting on a post; said center portions of each beam each having a mating half mortise notch in each portion to form a full mortise to place over a tenon on the top of a post.

BEST MODE FOR CARRYING OUT THE INVENTION

Figure 3:
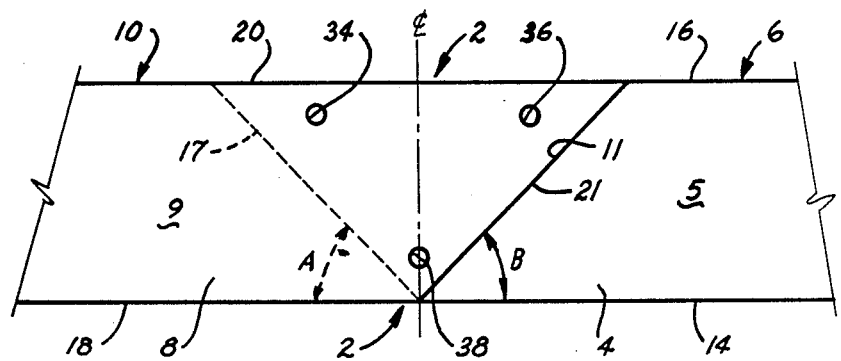
FIG. 3 is a side view of an unsupported wooden beam joint connected.
Figure 4:
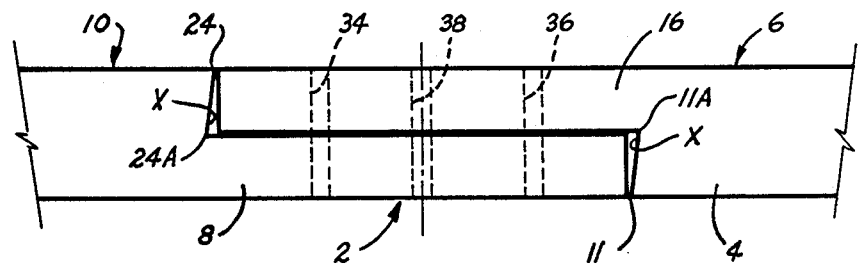
FIG. 4 is a top view of FIG. 3 showing the negative cut angles exaggerated for clarity.

The wood beam joint 2 shown in FIGS. 3 and 4 has one end 4 of a wood beam 6 contoured to fit with a mating end 8 of a wood beam 10. The ends 4 and 8 form an unsupported wooden beam joint 2. Said ends 4 and 8 have mating sides 5 and 9.

Figure 1:
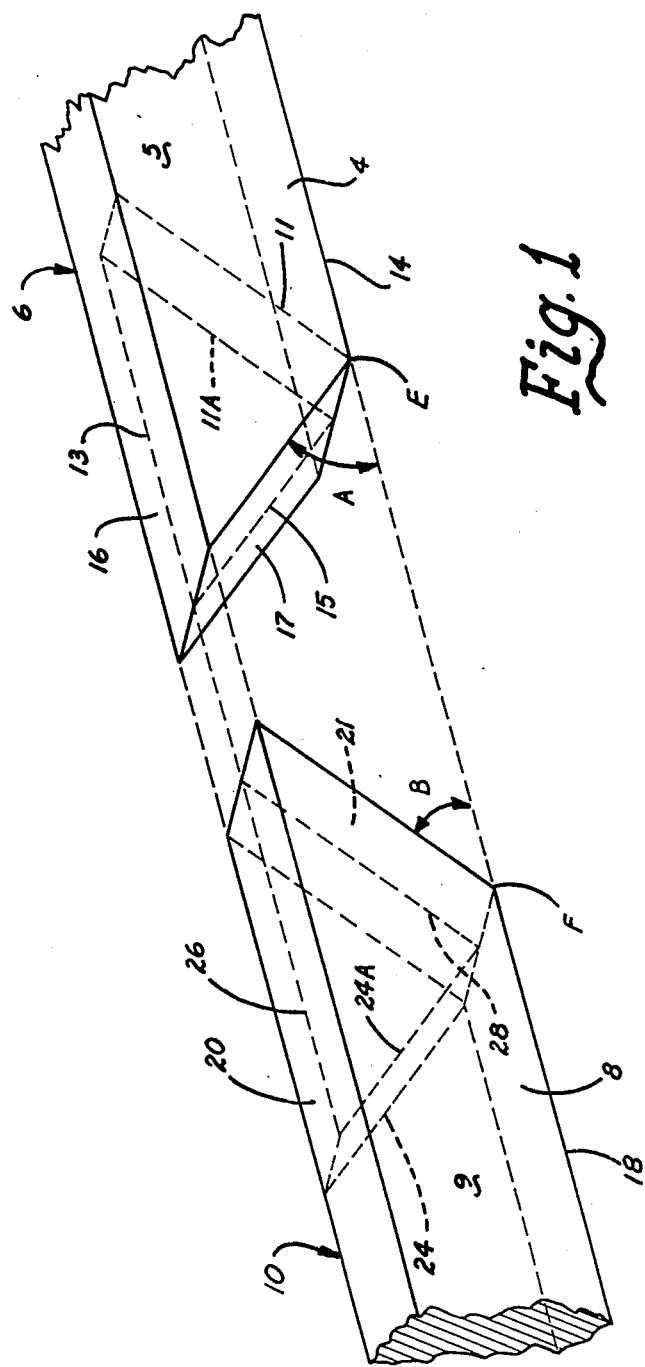
FIG. 1 is a perspective view of two wood beams in line, with their ends cut at 45° before final cut to remove an unwanted section to form an unsupported wooden beam joint.

As seen in FIG. 1, wood beam 6 has end 4 cut off at an angle A of 45° forming a short bottom surface 14, a long top surface 16, and an angled surface 17. Wood beam 10 has end 8 similarly cut off at an angle B of 45° forming a short bottom surface 18, a long top surface 20, and an angled surface 21.

Figure 2:
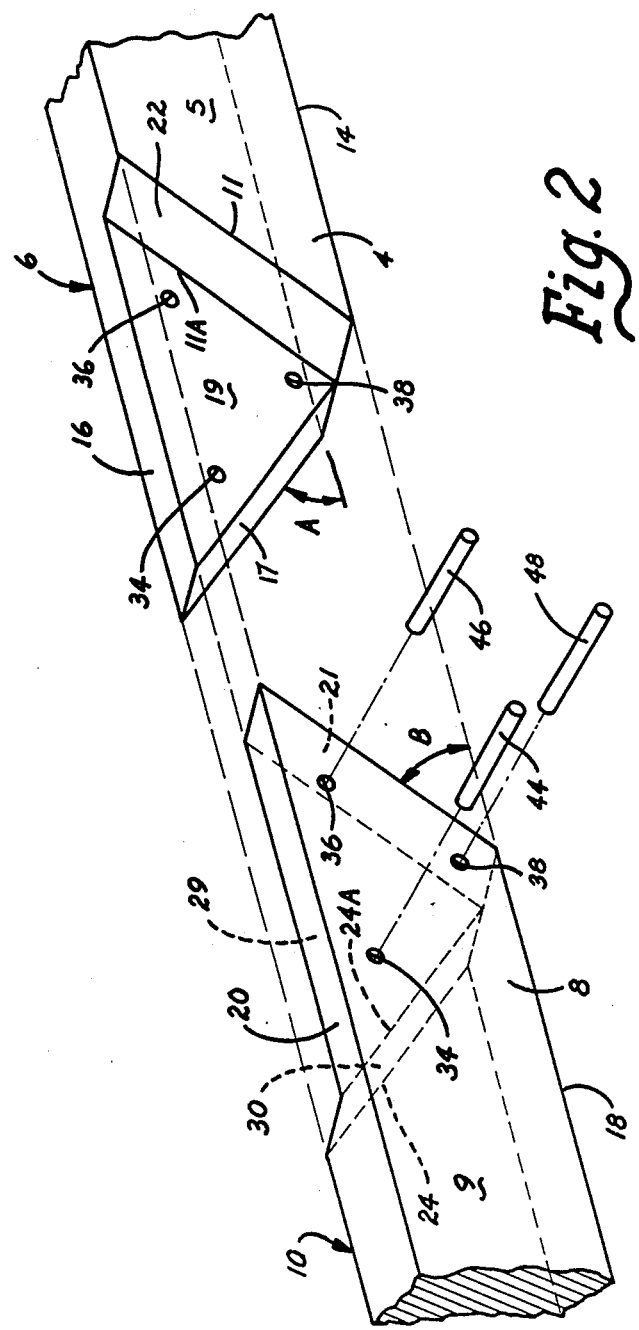
FIG. 2 is a perspective view of the two wood beams in line with unwanted section removed and showing wooden pegs for forming an unsupported wooden beam joint when beams are connected.

From the end of the short bottom surface 14 of wood beam 6 where it meets the angled surface 17 at E, lay out a line 11 at an angle equal to angle A across side 5 in an opposite direction from the angle A at the cut-off end 4. Cut on the line 11 halfway through the thickness of said beam 6 forming a line 11A, then cut along a line 13 at the midpoint of long top surface 16 and the midpoint line 15 of angled surface 17 to the line 11A and remove the unwanted triangular section of beam 6, leaving a triangular side tongue having a recessed triangular cut face 19 (see FIG. 2) parallel to the side 5 of the beam 6, with an angled surface 22 at the inner end, extending outwardly from line 11A to line 11 of the side 5.

From the end of the short bottom surface 18 of wood beam 10 where it meets the angled surface 21 at F (see FIG. 1), lay out a line 24 at an angle equal to angle B across the side opposite from side 9 in an opposite direction from the angle A at the cut-off end 8. Cut on the line 24 halfway through the thickness of said beam 10 forming a line 24A, then cut along a line 26 at the midpoint of long top surface 20 and the line 28 of angled surface 21 to the line 24A and remove the unwanted triangular section of beam 10 leaving a triangular side tongue having a recessed triangular cut face 29 (see FIG. 2) parallel to the side opposite from side 9, with an angled surface 30 at the inner end, extending outwardly from line 24A to line 24 of the side opposite from side 9.

It can be seen that these ends 4 and 8 of wood beams 6 and 10 can now be joined by placing the side tongues together with recessed triangular cut face 19 against the recessed triangular cut face 29 with the remaining one-half of surface 17 facing surface 30 and the remaining one-half of surface 21 facing surface 22.

Drill holes 34, 36 and 38 through the overlapped triangular tongues adjacent the apex of each corner. Place pegs 44, 46 and 48, respectively, in each hole 34, 36 and 38 to secure the joint. Holes 34, 36 and 38 can be made slightly tapered with the pegs 44, 46 and 48 tapered to fit and be forced to a frictional holding engagement.

The cut on the line 11 is made at a small negative undercut angle X (see FIG. 4) to prevent any interference between the mating surfaces 22 and 21. The cut on the line 24 is made at a small negative under-cut angle X to prevent any interference between the mating surfaces 17 and 30.

Figure 7:
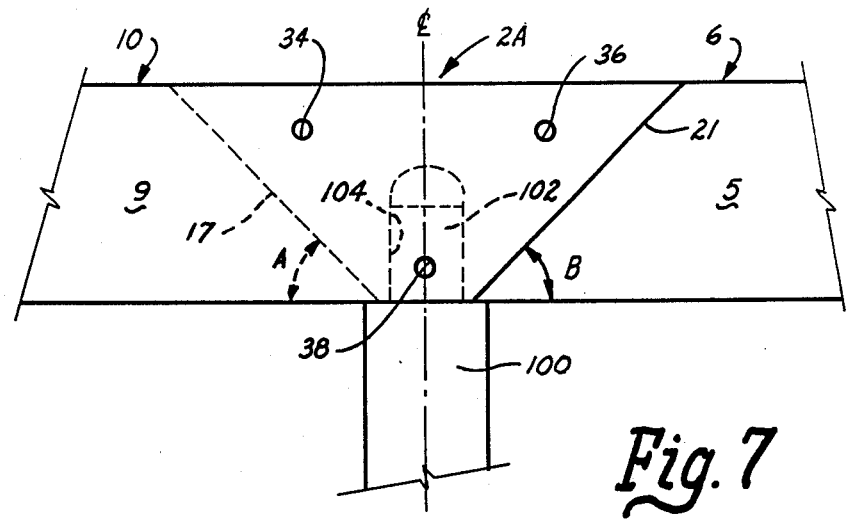
FIG. 7 is a side view of a post supported wooden beam joint having a mortise and tenon.
Figure 8:
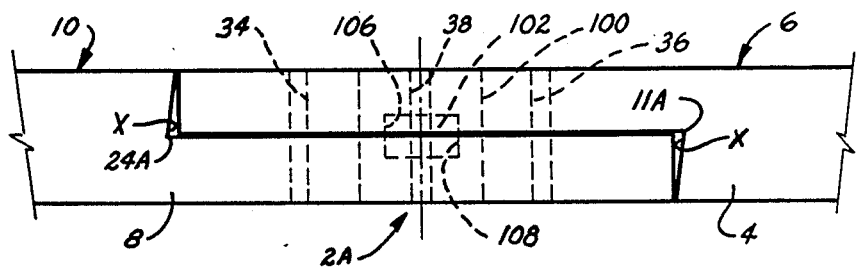
FIG. 8 is a top view of FIG. 7 showing the negative cut angles exaggerated for clarity.

The wood beam joint 2A shown in FIGS. 7 and 8 has one end 4 of a wood beam 6 contoured to fit with a mating end 8 of a wood beam 10. The ends 4 and 8 form a supported wooden beam joint 2A. Said ends 4 and 8 have mating sides 5 and 9. Post 100 is positioned to support the joint 2A in a manner to be hereinafter described.

Figure 5:
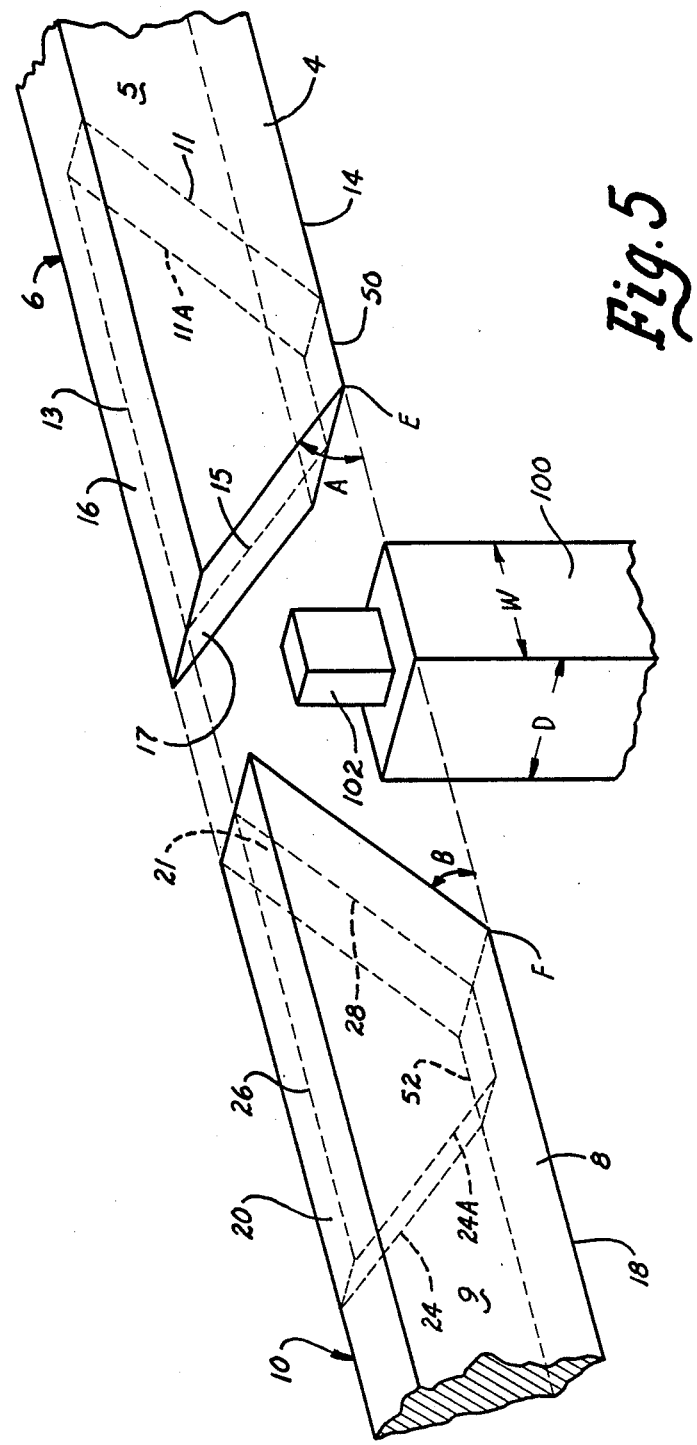
FIG. 5 is a perspective view of two wood beams in line, with their ends cut at 45° before final cut to remove an unwanted section, with a post inbetween having a tenon.

As seen in FIG. 5, wood beam 6 has end 4 cut off at an angle A of 45° forming a short bottom surface 14, a long top surface 16, and an angled surface 17. Wood beam 10 has end 8 similarly cut off at an angle B of 45° forming a short bottom surface 18, a long top surface 20, and an angled surface 21.

The wood beam joint 2A, is formed similar to wood beam 2, shown in FIGS. 3 and 4, with the addition of a straight portion 50 between the bottom end of angled surface 17 of wood beam 6 at E and the bottom end of angled surface 22 and the addition of a straight portion 52 placed between the bottom end of angled surface 21 of wood beam 10 at F and the bottom end of angled surface 30.

Figure 6:
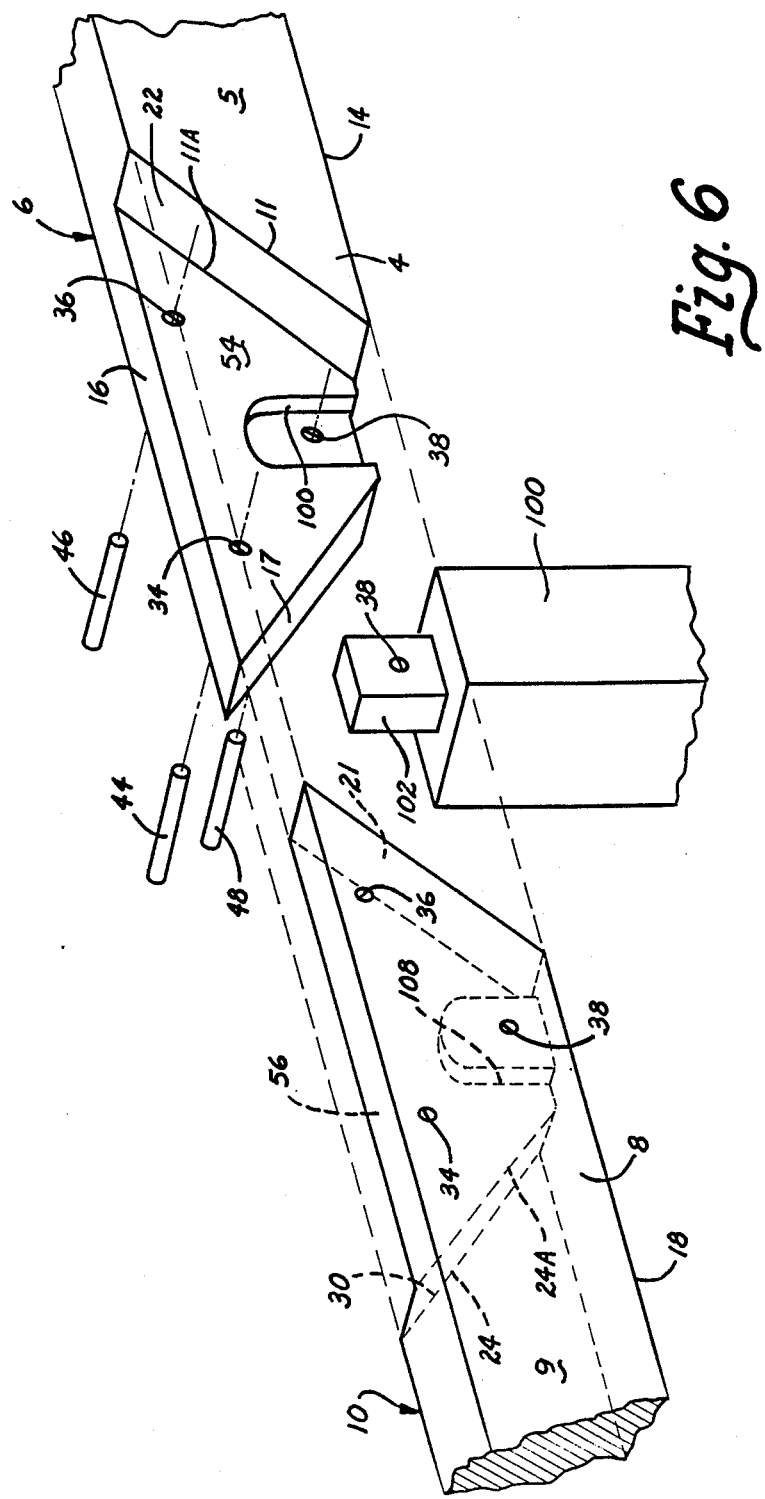
FIG. 6 is a perspective view of the two wood beams in line with unwanted section removed, half mortise notches formed in each wood beam, and showing wooden pegs for forming a post supported wooden beam joint when beams are connected and full mortise placed over a tenon on a post.

From the end of the short bottom surface 14 of wood beam 6 where it meets the angled surface 17 at E, lay out a straight line 50 for a distance that is less than the width W of the post 100. Then lay out a line 11 at an angle equal to angle A across side 5 in an opposite direction from the angle A at the cut-off end 4. Cut on the line 11 halfway through the thickness of said beam 6 forming a line 11A, then cut along a line 13 at the midpoint of long top surface 16 and the midpoint line 15 of angled surface 17 to the line 11A and remove the unwanted trapezoidal section of beam 6, leaving a trapezoidal side tongue having a recessed trapezoidal cut face 54 (see FIG. 6) parallel to the side 5 of the beam 6, with an angled surface 22 at the inner end, extending outwardly from line 11A to line 11 of the side 5.

From the end of the short bottom surface 18 of wood beam 10 where it meets the angled surface 21 at F, lay out a straight line 52 for a distance that is less than the width of the post 100. Then lay out a line 24 at an angle equal to angle B across the side opposite from side 9 in an opposite direction from the angle A at the cut-off end 8. Cut on the line 24 halfway through the thickness of said beam 10 forming a line 24A, then cut along a line 26 at the midpoint of long top surface 20 and the midpoint line 28 of angled surface 21 to the line 24A and remove the unwanted trapezoidal section of beam 10 leaving a trapezoidal side tongue having a recessed trapezoidal cut face 56 (see FIG. 6) parallel to the side opposite from side 9, with an angled surface 30 at the inner end, extending outwardly from line 24A to line 24 of the side opposite from side 9.

It can be seen that these ends 4 and 8 of wood beams 6 and 10 can now be joined by placing the side tongues together with recessed trapezoidal cut face 54 against the recessed trapezoidal cut face 56 with the remaining one-half of surface 17 facing surface 30 and the remaining one-half of surface 21 facing surface 22.

If the top of the post 100 is flat, it can be placed under the bottom portions of the overlapped trapezoidal tongues between lines 50 and 52. The top of the post 100 is of a width W (see FIG. 5) to hide the cut lines of the beams 6 and 10 of the beam joint 2A (see FIG. 7) on the bottom surfaces 14 and 18, and a depth D equal to the width of the beam.

If the top of the post 100 has a tenon 102, a mortise 104 can be placed in the connected beam joint 2A to receive the tenon 102. The tenon 102 extends from the center of the top of the post 100 for a height of approximately one-half of the height of the beams 6 and 10.

The mortise 104 for the tenon 102 is provided by forming one-half of the mortise 104 as a recess 106 (see FIG. 6) in the trapezoidal cut face 54 upwardly from the bottom portion of the trapezoidal tongue, and the other one-half as a recess 108 in the trapezoidal cut face 56 upwardly from the bottom portion of the trapezoidal tongue.

Drill holes 34, 36 and 38 through the overlapped trapezoidal tongues, one adjacent the apex of each top corner and one adjacent the bottom surface from lines 50 to 52 at the center thereof. Place pegs 44, 46 and 48, respectively, in each hole 34, 36 and 38 to secure the joint. Holes 34, 36 and 38 can be made slightly tapered with the pegs 44, 46 and 48 tapered to fit and be forced to a frictional holding engagement. Hole 38 extends through the tenon 102.

As with joint 2, the cut for joint 2A on the line 11 is made at a small negative undercut angle X to prevent any interference between the mating surfaces 22 and 21. The cut on the line 24 is made at a small negative undercut angle X to prevent any interference between the mating surfaces 17 and 30.

I claim:

1. A long wood beam including two short wood beams being connected in line, a first beam having a first attaching end, a second beam having a mating second attaching end, said first beam having a top and bottom, said second beam having a top and bottom, said first attaching end having a first tongue projecting from one side thereof in line with said second beam, said first tongue being one-half of the width of the frist beam, said first beam having a first matching recess adjacent said first tongue, said first tongue having an end surface, said end surface of said first tongue having a 45° angle tapering from the end of the top of the first attaching end of said first beam inwardly into said first beam to the bottom of said first beam, the first matching recess adjacent said first tongue having an end surface, said end surface of said first matching recess having a 45° angle extending upwardly from the end of the bottom of the first attaching end of said first beam to the top of said first beam, said mating second attaching end having a second tongue projecting from one side thereof in line with said first beam, said second tongue being one-half of the width of the second beam, said second beam having a second matching recess adjacent said second tongue, said second tongue having an end surface, said end surface of said second tongue having a 45° angle tapering from the end of the top of the second attaching end of said second beam inwardly into said second beam to the bottom of said second beam, the second matching recess adjacent said second tongue having an end surface, said end surface of said second matching recess having a 45° angle extending upwardly from the end of the bottom of the second attaching end of said second beam to the top of said second beam, said first and second tongues being located against each other, said first tongue occupying said second matching recess and said second tongue occupying said first matching recess, separate means fixing said tongues together.

2. A combination as set forth in claim 1 wherein said end surfaces of said first and second matching recesses each have a small negative undercut angle to prevent any interference between the end surfaces of said first and second matching recesses and the end surfaces of said first and second tongues.

3. A combination as set forth in claim 1 wherein said first tongue and said second tongue are formed as triangular in shape with two upper corners and a lower corner, said first matching recess and said second matching recess being sized to receive said triangular second tongue and triangular first tongue and place them together, said separate means fixing said tongues together comprising pin means, sets of aligned holes are in said two tongues for said pin means, one set of aligned holes being located at each upper corner and lower corner of said triangular first tongue and second tongue, said pin means including a pin positioned in each set of aligned holes.

4. A long wood beam including two short wood beams being connected in line, a first beam having a first attaching end, a second beam having a mating second attaching end, said first beam having a top and bottom, said second beam having a top and bottom, said first attaching end having a first tongue projecting from one side thereof in line with said second beam, said first tongue being one-half of the width of the first beam, said first beam having a first matching recess adjacent said first tongue, said first tongue having an end surface, said end surface of said first tongue having a 45° angle tapering from the end of the top of the first attaching end of said first beam inwardly into said first beam to the bottom of said first beam, said first tongue having a section extending straight inwardly from the bottom of the tapering end surface for a distance that is less than the width of a supporting post, the first matching recess adjacent said first tongue having an end surface, said end surface of said first matching recess having a 45° angle extending upwardly from the inward bottom end of said straight section to the top of said first beam, said mating second attaching end having a second tongue projecting from one side thereof in line with said first beam, said second tongue being one-half of the width of the second beam, said second beam having a second matching recess adjacent said second tongue, said second tongue having an end surface, said end surface of said second tongue having a 45° angle tapering from the end of the top of the second attaching end of said second beam inwardly into said second beam to the bottom of said second beam, said second tongue having a section extending straight inwardly from the bottom of the tapering end for a distance equal to the length of said section extending straight inwardly of said first tongue, the second matching recess adjacent said second tongue having an end surface, said end surface of said second matching recess having a 45° angle extending upwardly from the inward bottom end of said straight section to the top of said second beam, said first and second tongues being located against each other, said first tongue occupying said second matching recess and said second tongue occupying said first matching recess, separate means fixing said tongues together, a supporting post under said first and second attaching ends, the top of said supporting post engaging the joined straight sections.

5. A combination as set forth in claim 4 having a mortise in the bottom of said joined straight sections extending into both straight sections, said top of said supporting post having a tenon, said tenon positioned in said mortise.

6. A combination as set forth in claim 4 wherein said means fixing said tongues together comprise a plurality of sets of aligned holes in said two tongues, wooden pegs being located in each set of aligned holes.

7. A combination as set forth in claim 4 wherein the top of said post covers the ends of said first beam and second beam where they meet.

8. A long wood beam including two short wood beams being connected in line, a first beam having a first attaching end, a second beam having a mating second attaching end, said first beam having a top and bottom, said second beam having a top and bottom, said first attaching end having a first tongue projecting from one side thereof in line with said second beam, said first tongue being one-half of the width of the first beam, said first beam having a first matching recess adjacent said first tongue, said first tongue having an end surface, said end surface of said first tongue having a 45° angle tapering from the end of the top of the first attaching end of said first beam inwardly into said first beam to the bottom of said first beam, said first tongue having a section extending straight inwardly from the bottom of the tapering end surface for a distance that is less than the width of a supporting post, the first matching recess adjacent said first tongue having an end surface, said end surface of said first matching recess having a 45° angle extending upwardly from the inward bottom end of said straight section to the top of said first beam, said mating second attaching end having a second tongue projecting from one side thereof in line with said first beam, said second tongue being one-half of the width of the second beam, said second beam having a second matching recess adjacent said second tongue, said second tongue having an end surface, said end surface of said second tongue having a 45° angle tapering from the end of the top of the first attaching end of said second beam inwardly into said second beam to the bottom of said second beam, said second tongue having a section extending straight inwardly from the bottom of the tapering end for a distance equal to the length of said section extending straight inwardly of said first tongue, the second matching recess adjacent said second tongue having an end surface, said end surface of said second matching recess having a 45° angle extending upwardly from the inward bottom end of said straight section to the top of said second beam, said first and second tongues being located against each other, said first tongue occupying said second matching recess and said second tongue occupying said first matching recess, separate means fixing said tongues together, a supporting post under said first and second attaching ends, the top of said supporting post engaging the joined straight sections, a mortise in the bottom of said joined straight sections extending into both straight sections, said top of said supporting post having a tenon, said tenon positioned in said mortise, said mortise being formed by a mating mortise notch in each of the first and second tongues located against each other.

9. A method of joining two beams at meeting ends to become one continuous beam, said continuous beam having a selected side of each beam facing in the same direction, Step 1 - Select one side of first beam;

Step 2 - Cut off end of first beam at 45° angle forming a short bottom edge and long top edge on each side, Step 3 - From the bottom of the 45° angle cut of the first beam lay out a 45° angle line across said one side in an opposite direction from the 45° angle at the cut-off end of said first beam, Step 4 - Cut on the 45° angle line at a small negative undercut angle halfway through the thickness of said first beam, Step 5 - Remove unwanted triangular section of said first beam from cut halfway through the thickness of said first beam to the 45° angle end of said first beam leaving a first triangular recessed cut face parallel to the one side of said first beam, Step 6 - Select one side of second beam, Step 7 - Cut off end of second beam at 45° angle forming a short bottom edge and long top edge on each side so that when the meeting cut-off ends of said two beams are brought together said selected sides of both beams form one side of the continuous beam, Step 8 - From the bottom of the 45° angle cut of the second beam lay out a 45° angle line across said other side in an opposite direction from the 45° angle at the cut-off end of said second beam, Step 9 - Cut on the 45° angle line at a small negative undercut angle halfway through the thickness of said second beam, Step 10 - Remove unwanted triangular section of said second beam from cut halfway through the thickness of said second beam to the 45° angle end of said second beam leaving a second triangular recessed cut face parallel to the other side of said second beam, Step 11 - Place the first triangular recessed cut face of said first beam against the second triangular recessed cut face of said second beam with the 45° angle cut-off ends of the first and second beams meeting the cooperating ends of the cuts made halfway through the thickness of the first and second beams, Step 12 - Fix the ends of the two beams together by placing wooden pegs through the overlapped sections having the first and second recessed cut faces.

10. A method of joining two beams at meeting ends to become one continuous beam for positioning over a post, said continuous beam having a selected side of each beam facing in the same direction, Step 1 - Select one side of first beam;

Step 2 - Cut off end of first beam at 45° angle forming a short bottom edge and long top edge on each side, Step 3 - Measure from the cut-off end along the short bottom edge of one side of said first beam to a point that is less than the width of a post, and then from that point lay out a 45° angle line across said one side in an opposite direction from the 45° angle at the cut-off end of said first beam, Step 4 - Cut on the 45° angle line at a small negative undercut angle halfway through the thickness of said first beam, Step 5 - Remove unwanted section of said first beam from cut halfway through the thickness of said first beam to the 45° angle end of said first beam leaving a first recessed cut face parallel to the one side of said first beam, Step 6 - Select one side of second beam, Step 7 - Cut off end of second beam at 45° angle forming a short bottom edge and long top edge on each side so that when the meeting cut-off ends of said two beams are brought together said selected sides of both beams form one side of the continuous beam, Step 8 - Measure from the cut-off end along the short bottom edge of the other side of said second beam to a point that is less than the width of a post, and then from that point lay out a 45° angle line across said other side in an opposite direction from the 45° angle at the cut-off end of said second beam, Step 9 - Cut on the 45° angle line at a small negative undercut angle halfway through the thickness of said second beam, Step 10 - Remove unwanted section of said second beam from cut halfway through the thickness of said second beam to the 45° angle end of said second beam leaving a second recessed cut face parallel to the other side of said second beam, Step 11 - Place the first recessed cut face of said first beam against the second recessed cut face of said second beam with the 45° angle cut-off ends of the first and second beams meeting the cooperating ends of the cuts made half-way through the thickness of the first and second beams, Step 12 - Fix the ends of the two beams together by placing wooden pegs through the overlapped sections having the first and second recessed cut faces.

11. A method as set forth in claim 10 including

Step 13 - Form a mortise in the bottom surface of the connected beams for receiving a tenon on a post.

12. A method as set forth in claim 10 wherein

Step 5 - removal of said unwanted section of said first beam leaves a first trapezoidal side tongue having a first recessed cut face, Step 10 - removal of said unwanted section of said second beam leaves a second trapezoidal side tongue having a second recessed cut face, Step 11 - said trapezoidal side tongues have their bottom surfaces placed side by side, Step 13 - place a post under the side-by-side bottom surfaces of said trapezoidal side tongues.

13. A method as set forth in claim 12 wherein

Step 13 - said post having a tenon extending from the top thereof,

Step 14 - cut a mortise into the side-by-side bottom surfaces of said trapezoidal side tongues to receive said tenon.

14. A method of joining two beams at meeting ends to become one continuous beam for positioning over a post, said continuous beam having a selected side of each beam facing in the same direction, Step 1 - Select one side of first beam;

Step 2 - Cut off end of first beam at 45° angle forming a short bottom edge and long top edge on each side, Step 3 - Measure from the cut off end along the short bottom edge of one side of said first beam to a point that is less than the width of a post, and then from that point lay out a 45° angle line across said one side in an opposite direction from the 45° angle at the cut-off end of said first beam, Step 4 - Cut on the 45° angle line at a small negative undercut angle halfway through the thickness of said first beam, Step 5 - Remove unwanted section of said first beam from cut halfway through the thickness of said first beam to the 45° angle end of said first beam leaving a first trapezoidal side tongue having a recessed cut face parallel to the one side of said first beam, Step 6 - Select one side of second beam, Step 7 - Cut off end of second beam at 45° angle forming a short bottom edge and long top edge on each side so that when the meeting cut-off ends of said two beams are brought together said selected sides of both beams form one side of the continuous beam, Step 8 - Measure from the cut-off end along the short bottom edge of the other side of said second beam to a point that is less than the width of a post, and then from that point lay out a 45° angle line across said other side in an opposite direction from the 45° angle at the cut-off end of said second beam, Step 9 - Cut on the 45° angle line at a small negative undercut angle halfway through the thickness of said second beam, Step 10 - Remove unwanted section of said second beam from cut halfway through the thickness of said second beam to the 45° angle end of said second beam leaving a second trapezoidal side tongue having a recessed cut face parallel to the other side of said second beam, Step 11 - Place the first recessed cut face of said first beam against the second recessed cut face of said second beam with the 45° angle cut-off ends of the first and second beams meeting the cooperating ends of the cuts made halfway through the thickness of the first and second beams and said trapezoidal side tongues have their bottom surfaces placed side by side, Step 12 - Fix the ends of the two beams together by placing wooden pegs through the overlapped sections having the first and second recessed cut faces, Step 13 - place a post under the side by side bottom surfaces of said trapezoidal side tongues, said post having a tenon extending from the top thereof, Step 14 - forming a mortise between said trapezoidal side tongues by placing a mating mortise notch in each of the first and second recessed cut faces of said tongues.

* * * * *